April 4, 1944.  G. HOHWART  2,345,750

GAUGE

Filed Oct. 6, 1943

INVENTOR.
George Hohwart.
BY
Harness, Dickey & Pierce
ATTORNEYS.

Patented Apr. 4, 1944

2,345,750

UNITED STATES PATENT OFFICE 2,345,750

GAUGE

George Hohwart, Orchard Lake, Mich., assignor to N. A. Woodworth Company, Ferndale, Mich., a corporation of Michigan Application October 6, 1943, Serial No. 505,113

7 Claims. (Cl. 33—178)

This invention relates to gauges and particularly to plug gauges, thread gauges or the like and has particular reference to a means for removably securing such gauges to a handle, the principal object being the provision of a new and novel means for securing gauges of the type described to a manipulating handle therefor.

Objects of the invention include the provision of a handle construction for gauges of the type described that is light in weight, simple in construction and economical to manufacture; the provision of a handle for gauges of the type described that may be formed from sheet metal or tubing; the provision of a gauge including a handle and a gauging element having a novel form of interconnection therebetween; the provision of a gauge of the type described having a novel form of connection between the gauge and the handle which will protect that portion of the gauge received within the handle from contact with moisture or the like; the provision of a gauge of the type described in which the gauging element is reversible whereby both ends may be employed as a gauging element, thereby providing longer life for the element; the provision of a gauge of the type described in which the gauging element is secured to the handle through a relatively rigid but yieldable member serving to lock the two together; and the provision of a construction as above described in which the yieldable member is contracted about the gauging element during application to the handle member proper whereby to lock the handle member and the gauging element rigidly together.

The above being among the objects of the present invention, the same consists in certain novel details of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views, Fig. 1 is a side elevational view of a gauge constructed in accordance with the present invention;

Plug gauges, thread gauges, and the like are generally constructed in two parts one of which comprises a handle having a bore therethrough which is tapered outwardly adjacent one end and the other comprising the gauge proper with a short circularly sectioned shank complementary in size and shape to the tapered opening in the end of the handle and frictionally received therein. Such handles in the past have been made from solid metallic and usually steel bar stock machined to shape and consequently have been relatively heavy. It has been proposed heretofore in making plug gauges to make the plug as a purely cylindrical part, devoid of a shank, approximately twice as long as that required for a gauging operation, and to secure it in position in a handle of the type above described by means of a split tapered collar which surrounds one end of the gauge and which collar is driven into the tapered end of the handle to cause it to be contracted about the gauge. While this last form of construction is satisfactory in most respects the slot in the tapered sleeve permits water or solutions having water therein to enter the sleeve and come in contact with that part of the gauge enclosed in the sleeve where the gauging operation is carried out in the presence of water or such solution. In such case it is generally found that that portion of the gauge within the sleeve has corroded so as to render it useless when it is desired to reverse the gauging element in the sleeve in order to use the opposite end thereof for a gauging operation.

The present invention provides a construction whereby all of the advantages of the last mentioned construction are obtained while the disadvantages thereof are eliminated. Additionally, it provides a construction that is much lighter in weight, one in which the handle proper may be easily and cheaply formed from sheet metal or tubing, and one which is adaptable for use either in connection with the reversible types of gauges or with gauges having the conventional tapered type of shank.

Figure 1:
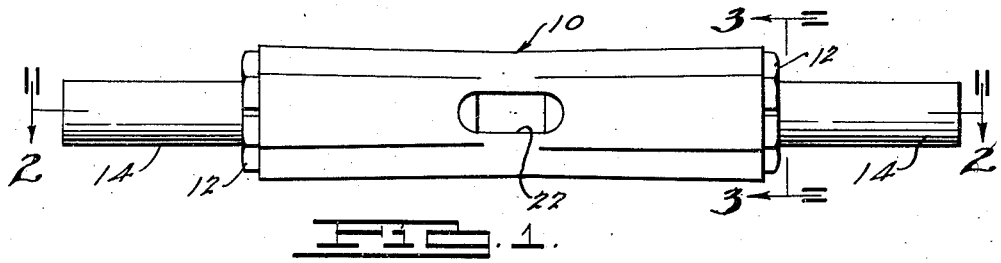
Figure 2:
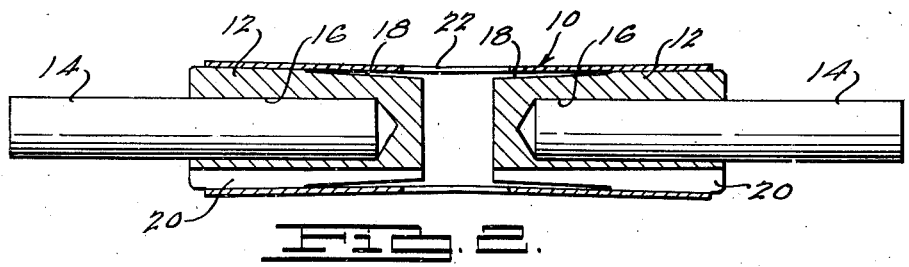
Fig. 2 is a sectional view of the gauge shown in Fig. 1 taken axially therethrough as on the line 2—2 of Fig. 1.
Figure 3:
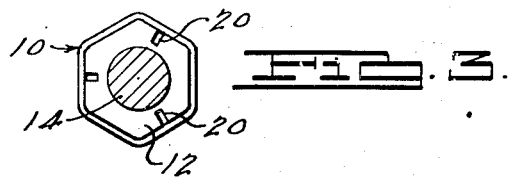
Fig. 3 is a transverse sectional view of the gauge shown in Fig. 1, taken as on the line 3—3 thereof and showing the handle in end view.

Referring now to the accompanying drawing and particularly to Figs. 1, 2, and 3 it will be noted that the handle comprises a main body portion indicated generally at 10 in the form of a relatively thin metal tube the opposite end portions of which are preferably formed to a non-circular cross-sectional conformation and are outwardly flared to a slight degree. While any suitable non-circular conformation for the end portions of the handle 10 may be employed it is preferable to make them polygonal, as for instance hexagonal, and as best brought out in Fig. 3 this is the conformation shown in the drawing by way of illustration. The outward flare of the ends of the handle 10 may be varied between greater or lesser limits as long as the included angle between opposite sides is less than the angle of friction between the handle 10 and the collar member adapted to be received therein and to be described hereafter, but an included angle of about 6 degrees has been found most satisfactory.

Within each end of the handle portion 10 is received a so-called collar member 12, particularly the axially outer portion of which is externally formed for complementary engagement within the corresponding end of the handle. In other words, the outer portion of each of the collar members 12 shown in Figs. 1 to 3, inclusive, is hexagonal in cross-sectional configuration and is axially tapered into conformity with the axial taper of the corresponding end portions of the inner walls of the handle 10.

In the construction illustrated in Figs. 1 to 3, inclusive, the gauging elements are illustrated as plug gauges 14 of the reversible type, that is each is approximately twice as long as that actually required for a gauging operation and they are cylindrical throughout. In such case the collar members 12 are preferably made of greater length than that portion of the gauge element 14 to be received therein and each is provided with an axial cylindrical opening 16 of a size to closely but slidably receive the corresponding plug gauge element 14 therein when the corresponding collar member 12 is in free condition. The bores 16 in such case are preferably stopping short of the inner ends of the collar members 12 for a purpose to be hereafter explained. Where such construction is employed it is preferable to relieve the axially inner ends of the collar members 12 as indicated at 18 so that such axially inner ends will not actually engage the inner walls of the handle 10.

It will be appreciated that one of the gauging elements 14 will constitute a so-called "go" gauge that will be employed for the purpose of determining whether or not a hole to be gauged is of sufficiently large size, and the other gauging elements 14 will be so-called "no-go" gauge as will be employed in the gauging of a hole to determine whether or not the hole is of too large a size.

In assembling the gauge illustrated in Figs. 1 to 3, inclusive, the gauge elements 14 will first be inserted in the sleeves 12 and then the assembly comprising the sleeves 12 and the corresponding elements 14 will be inserted in the corresponding ends of a handle 10 and the collar members 12 will be driven axially inwardly thereof by any suitable means in order to contract them about the corresponding gauging element 14, thus to frictionally lock it thereto, and at the same time to cause it to be frictionally locked itself to the handle 10. The collar members 12 being free of slots extending to the bore thereof it will be appreciated that it is necessary for the successful carrying out of the present invention that the collar members 12 be formed of a material which will permit the contraction thereof about the gauging elements 14 under the circumstances described. For this reason the collar members 12 are preferably formed of a suitable relatively rigid but yet yieldable metallic material. A number of different materials have been found satisfactory for this use. A number of the so-called modern plastics such as some of the artificial resinous products commonly found on the market have been found to be suitable. Hard rubber or the like is also suitable. Phenolic condensation products have been found satisfactory and hard wood may be employed if desired. Soft brass, aluminum, or the like may be used.

Where the material employed for the collar members 12 is not of sufficiently yieldable characteristics when the walls thereof are in solid form, then as particularly brought out in Figs. 2 and 3 the collar members 12 may be provided with one or more slots 20 in their outer surfaces extending axially thereof. It will be appreciated, of course, that such slotting has the effect of increasing the yieldability of the collar members. Where such slots are employed they should not be extended into the bore of the collar members as otherwise when the gauge is employed in such a manner as to expose it to moisture such moisture would find its way to those surfaces of the gauging elements within the collar members 12 and might cause them to corrode, thereby rendering them useless for gauging purposes upon reversal. Making the bores 16 of the collar members 12 blind is for the purpose of further protecting the gauging element in this respect.

The handle member 10 is, of course, preferably provided with so-called knock-out or drift hole or holes for the purpose of enabling the collar members 12 and their gauging elements to be removed from the handle when desired. In the construction illustrated in Figs. 1 to 3, inclusive, in view of the fact that the inner axial ends of the collar members 12 approach into relatively close relationship with respect to each other, a single knock-out or drift hole 22 extending diametrically through a handle at its midpoint and of such axial length as to expose the ends of the collar members 12 therethrough may be employed as shown.

It will be appreciated that with the construction illustrated in Figs. 1 to 3, inclusive, each gauging element 14 is approximately twice as long as that required for use in a gauging operation in practice and that when the exposed end of either gauging element has been worn to a point rendering it no longer satisfactory for an accurate operation, it may be removed with its corresponding collar 12, then removed from the collar 12 and reversed, whereupon it and the collar 12 may be reinserted in position and may be employed until such remaining end of the gauging element has also become worn to such an extent as to render it unfit for further service, whereupon the entire gauging element may be replaced.

The handle 10 may obviously be formed either from sheet metal rolled up to shape with its opposed edges suitably secured together or may be formed directly from cylindrical tubing and operated upon to the shape shown. Its wall thickness may be relatively light and in view of the fact that most of the materials from which the collar members 12 will be formed are relatively light in weight it will be appreciated that the completed gauge is materially lighter than gauges of conventional construction and, particularly when in the larger sizes, are less tiresome than the conventional gauges for a workman to handle.

Figure 4:
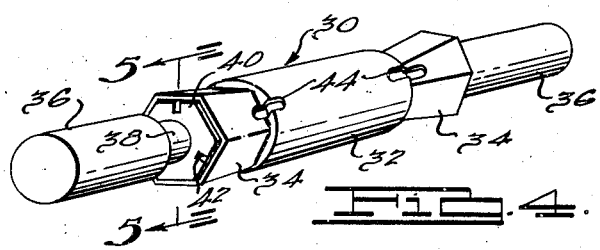
Fig. 4 is a perspective view of a modified form of construction.
Figure 5:
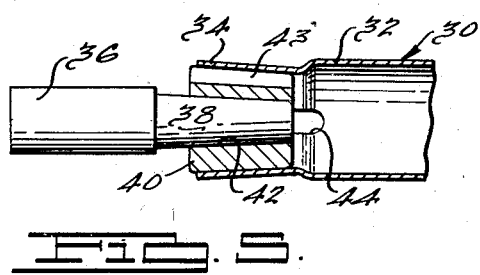
Fig. 5 is an enlarged, fragmentary sectional view taken axially through one end of the gauge in Fig. 4, as on the line 5—5 of Fig. 4.

The construction illustrated in Figs. 4 and 5 is similar to that illustrated in Figs. 1 to 3, inclusive, except that in this case, for the purpose of explanation, the gauge members are shown as provided with a conventional tapered shank and the handle portion is formed in a slightly different manner from a piece of cylindrical metallic tubing. Referring to Figs. 4 and 5, it will be noted that the handle portion indicated generally at 30 comprises a central cylindrical portion or body 32 having end portions 34 of non-circular cross-sectional configuration, shown as hexagonal for the purpose of illustration. In this case the handle 30 is made from a piece of tubing of the same diameter as the main body portion 32 and the end portions 34 are formed by swaging or otherwise forming the metal thereof as indicated to provide the same type of end portion as is provided in the first described construction, that is one which tapers inwardly toward the midpoint of the handle. Preferably the axially outer end of the hexagonal end portions 35 are of such size that the axially outer points of the hexagonal section project radially beyond the extended surface of the main body portion 32 so that the gauge will not roll when placed on a flat surface. Likewise the inner ends of the hexagonal end portions 34 are preferably of smaller dimensions than the dimensions of the main body portion 32 so that in event the collar members project inwardly beyond the end portions 34 they will be free of contact with the main body portion 32.

The gauge members in the construction illustrated in Figs. 4 and 5 are assumed to be of the construction best brought out in Fig. 5, that is each comprises a cylindrical body portion 36 and a tapered concentric circular sectioned shank 38. Under such circumstances, in view of the fact that the construction is not reversible as in the construction illustrated in Figs. 1 to 3, inclusive, there is no need to protect the shank 38 from the effects of moisture as is desirable in connection with the axially inner portions of the gauge members 14 in the first described construction and, consequently, the collar members 40, corresponding to the collar members 12 first described, may be provided with bores 42 complementary to the shank 38 and which bores project completely axially through the collar members 40 as shown. The collar members 40 are preferably although not necessarily longitudinally slotted as at 43 as in the first described construction.

Where the non-reversible type of gauge member illustrated in Figs. 4 and 5 is employed the shanks 38 are usually shorter than the gauge portion 36 thereof and, accordingly, instead of providing a central drift or knock-out hole, such as the hole 22 provided in the first described construction, a knock-out hole 44 is provided in the handle 30 adjacent the inner end of one or both of the collars 40. Although two such drift or knock-out holes 44 are shown it is common practice to employ only one so that after knocking out one of the gauging elements a rod may be inserted through that end of the handle to knock out the remaining gauging elements and, accordingly, only one knock-out or drift hole 44 may be provided if desired on a double ended gauge of the character shown.

Having thus described my invention what I claim by Letters Patent is:

What is claimed is:

1. A gauge comprising, in combination, a thin walled hollow metallic handle having non-circularly sectioned end portions axially outwardly flared, a collar member having a circumferentially unbroken bore received within said end portion and frictionally secured therein, and a work engaging element having a portion received within said collar member and frictionally locked thereto.

2. A gauge comprising, in combination, a hollow metallic handle member of relatively thin wall section having a non-circularly sectioned axially outwardly flaring end portion, a relatively yieldable collar member having an exterior surface portion complementary in size, shape and contour to the interior walls of said end portion received therein, said collar member having a bore free of direct communication with the circumferentially outer surface thereof, and a gauging element received in said bore, said collar member being radially contracted in said end portion and contracted around said gauging element to frictionally lock said gauging element to said handle member.

3. A gauge comprising, in combination, a hollow metallic handle member of relatively thin wall section having a non-circularly sectioned axially outwardly flaring end portion, a relatively yieldable collar member having an exterior surface portion complementary in size, shape and contour to the interior walls of said end portion received therein, said collar member having a blind axial bore therein opening onto the axially outer end thereof, and a gauging element received in said bore and frictionally locked to said collar member therein.

4. A gauge comprising, in combination, a thin walled hollow metallic handle having non-circularly sectioned end portions axially outwardly flared, a non-metallic collar member having a circumferentially unbroken bore received within said end portion and frictionally secured therein, said collar member being provided with a plurality of axially directed slots in the outer surface thereof terminating short of the bore of said collar member, and a gauging element having a portion received within said collar member and frictionally locked thereto.

5. A gauge comprising, in combination, a hollow metallic handle member of relatively thin wall section having a non-circularly sectioned axially outwardly flaring end portion, a non-metallic but relatively yieldable collar member having an exterior surface portion complementary in size, shape and contour to the interior walls of said end portion received therein, said collar member having a cylindrical bore free of direct communication with the circumferentially outer surfaces thereof, and a cylindrical gauging element received in said bore, said collar member being radially contracted in said end portion and contracted around said gauging element to frictionally lock said gauging element to said handle member.

6. A gauge comprising a thin walled hollow metallic handle portion having a cylindrical central portion and outwardly flared non-circular end portion, a non-metallic collar member having an exterior surface portion complementary in size, shape and contour to the inner walls of said end portion frictionally locked in said end portion, and a gauge member having a portion thereof received in the bore of said collar member and frictionally locked to said collar member.

7. A gauge comprising a thin walled hollow metallic handle member having an end portion of polygonal cross-sectional configuration and axially outwardly flared at an included angle of about 6 degrees, a non-metallic collar member having an exterior surface portion complementary in shape and contour to the inner walls of said end portion received in said end portion and frictionally locked thereto, and a gauge member having a portion received within the bore of said collar member and frictionally locked to said collar member.

GEORGE HOHWART.